(12) United States Patent
Jung et al.

(10) Patent No.: US 11,125,197 B2
(45) Date of Patent: Sep. 21, 2021

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Byunghwan Jung, Gwangmyeong-si (KR); Sukhyun Joo, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/784,547

(22) Filed: Feb. 7, 2020

(65) Prior Publication Data
US 2021/0115888 A1    Apr. 22, 2021

(30) Foreign Application Priority Data
Oct. 16, 2019 (KR) .......... 10-2019-0128453

(51) Int. Cl.
| | |
|---|---|
| B60L 50/61 | (2019.01) |
| F02N 11/04 | (2006.01) |
| F02N 11/08 | (2006.01) |
| B60L 50/60 | (2019.01) |
| H02J 7/14 | (2006.01) |
| F02N 19/00 | (2010.01) |

(52) U.S. Cl.
CPC .......... *F02N 11/0803* (2013.01); *B60L 50/60* (2019.02); *B60L 50/61* (2019.02); *F02N 11/04* (2013.01); *F02N 11/0814* (2013.01); *F02N 11/0818* (2013.01); *F02N 11/0822* (2013.01); *F02N 11/0844* (2013.01); *F02N 11/0862* (2013.01); *F02N 19/005* (2013.01); *H02J 7/14* (2013.01); *F02N 2019/008* (2013.01); *F02N 2200/021* (2013.01)

(58) Field of Classification Search
CPC .......... B60L 50/60; B60L 50/61; F02N 11/04; F02N 11/0814; F02N 11/0818; F02N 11/0822; F02N 11/0844; F02N 19/005; F02N 2019/008; F02N 2200/021
USPC ........................................ 701/113; 123/179.4
See application file for complete search history.

(56) References Cited

U.S. PATENT DOCUMENTS

| | | | | |
|---|---|---|---|---|
| 2002/0171383 | A1* | 11/2002 | Hisada | F02D 29/06 318/432 |
| 2004/0149247 | A1* | 8/2004 | Kataoka | F02N 11/006 123/179.4 |
| 2008/0127935 | A1* | 6/2008 | Park | B60K 6/48 123/332 |

(Continued)

FOREIGN PATENT DOCUMENTS

| | | |
|---|---|---|
| JP | 2004124878 A | 9/2005 |
| JP | 2000283010 A | 5/2008 |

(Continued)

*Primary Examiner* — Erick R Solis

(57) ABSTRACT

The vehicle includes an engine comprising a crankshaft, a crankshaft position sensor (CKP) configured to generate a pulse signal corresponding to a rotation of the crankshaft, a battery, a hybrid starter generator (HSG) configured to start the engine based on a power of the battery and charge the battery, and a motor controller unit (MCU) configured to determine a rotation angle of the crankshaft based on the pulse signal received from the CKP, and control the HSG based on the determined rotation angle.

18 Claims, 7 Drawing Sheets

(56) References Cited

U.S. PATENT DOCUMENTS

2016/0266008 A1* 9/2016 Park ................... F02N 19/005
2017/0282890 A1* 10/2017 Fujimoto ............. B60W 10/08
2018/0223787 A1* 8/2018 Bernardini ........... F02N 19/005

FOREIGN PATENT DOCUMENTS

| JP | 2001254646 A | 1/2009 |
| KR | 10-2002-0070985 A | 9/2002 |
| KR | 10-2005-0095631 A | 9/2005 |
| KR | 10-0828818 B1 | 5/2008 |
| KR | 10-2009-0008774 A | 1/2009 |

* cited by examiner

VEHICLE AND CONTROL METHOD THEREOF

CROSS-REFERENCE TO RELATED APPLICATION

The present application claims priority to and the benefit of Korean Patent Application No. 10-2019-0128453, filed on Oct. 16, 2019, which is incorporated herein by reference in its entirety.

TECHNICAL FIELD

The disclosure relates to a hybrid vehicle using the motor and the engine as power sources, and a control method thereof.

BACKGROUND

The statements in this section merely provide background information related to the present disclosure and may not constitute prior art.

In general, a hybrid vehicle is composed of an engine which is an internal combustion engine and a drive motor (hereinafter, a motor) powered by electricity. The drive motor operates by receiving power from a battery provided in the vehicle. The hybrid vehicle controls the motor so that the fuel economy of the engine is the highest in response to each driving situation. In addition, the hybrid vehicle can achieve improved fuel economy compared to the existing gasoline engine by recovering the kinetic energy as electrical energy during braking or deceleration.

The hybrid vehicle includes the engine's idle stop and go (ISG) function when driving below a preset velocity or stopping the vehicle, and prevents the engine from idling. Hybrid vehicles start the engine again when the driver is willing to operate the vehicle, minimizing fuel consumption during engine idle.

In general, the engine control is divided into a synchronization process to detect the first missing tooth from the pulse signal of the crankshaft position sensor (CKP), which detects the rotation of the crankshaft, an injection calculation process to calculate the cylinder to start the first combustion based on the position signal of the camshaft position sensor (CAM) that detects the rotation of the camshaft, an injection process for injecting fuel into the cylinder to be first combustion and an ignition process that applies a high voltage to the spark plug of the cylinder where the initial combustion will occur and generates sparks. According to the above-described starting procedure, after the initial cranking of the engine according to the stop position, the crankshaft rotates 280 degrees to 640 degrees, and then combustion occurs.

Conventionally, a hybrid vehicle stores rotation information of a crankshaft and position signal of a CAM in an engine control unit (ECU) that controls an engine when the engine is stopped. When the engine is restarted, the ECU calculates the stop position of the crankshaft, and transmits the calculated value to the motor control unit (MCU) that operates the hybrid starter generator (HSG). That is, as the ECU and the MCU operate twice to restart the engine, there is a problem that the starting time increases and the current consumption increases with the increase of the operation time of the MCU.

SUMMARY

The present disclosure provides a vehicle for controlling the rotation of the crankshaft through the motor control by the MCU receiving the pulse signal of the crankshaft calculated in the conventional ECU, and a control method thereof.

In one aspect of the present disclosure, a vehicle includes: an engine including a crankshaft; a crankshaft position sensor (CKP) configured to generate a pulse signal according to the rotation of the crankshaft; a battery; a hybrid starter generator (HSG) configured to start the engine based on the power of the battery and charge the battery; and a motor controller unit (MCU) configured to determine a rotation angle of the crankshaft based on the pulse signal received from the CKP, and control the HSG based on the determined rotation angle.

The MCU may be configured to control the HSG to rotate the crankshaft based on the determined rotation angle and a preset stop section.

The vehicle may further include: an inputter configured to receive a starting stop command of a user, and the MCU may be configured to stop operation of the HSG based on the starting stop command.

The MCU may be configured to determine a stop section corresponding to the starting stop command and control the HSG to locate the crankshaft in the determined stop section based on a missing tooth included in the pulse signal.

The vehicle may further include: a CAMshaft Position Sensor (CAM) configured to detect a position signal of a camshaft included in the engine; and an Engine Control Unit (ECU) configured to control the engine, and the MCU may be configured to control the HSG while the ECU stops controlling the engine.

The ECU may be configured to control the engine after the MCU rotates the crankshaft.

The MCU may be configured to rotate the crankshaft based on a first starting stop command, and count time.

The MCU may be configured to compare the counted time with a preset time.

The MCU may be configured to change the stop section after the preset time elapses, and rotate the HSG based on the changed stop section.

In another aspect of the present disclosure, a control method of a vehicle including an Engine Control Unit (ECU) controlling engine and a motor controller unit (MCU) controlling a hybrid starter generator (HSG), includes: receiving, by the MCU, a pulse signal according to rotation of a crankshaft of the engine transmitted from a crankshaft position sensor (CKP); determining a rotation angle of the crankshaft based on the pulse signal; and controlling, by the MCU, the HSG based on the determined rotation angle.

The controlling may include: controlling the HSG to rotate the crankshaft based on the determined rotation angle and a preset stop section.

The control method may further include: receiving a starting stop command of a user, and the controlling may include: stopping operation of the HSG based on the starting stop command.

The controlling may include: determining a stop section corresponding to the starting stop command and controlling the HSG to locate the crankshaft in the determined stop section based on a missing tooth included in the pulse signal.

The controlling may include: controlling the HSG while the ECU stops controlling the engine.

The control method may include: controlling, by the ECU, the engine after the MCU rotates the crankshaft.

The controlling may include: rotating the crankshaft based on a first starting stop command; and counting time.

The controlling may include: comparing the counted time with a preset time.

The controlling may include: changing the stop section after the preset time elapses, and rotating the HSG based on the changed stop section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
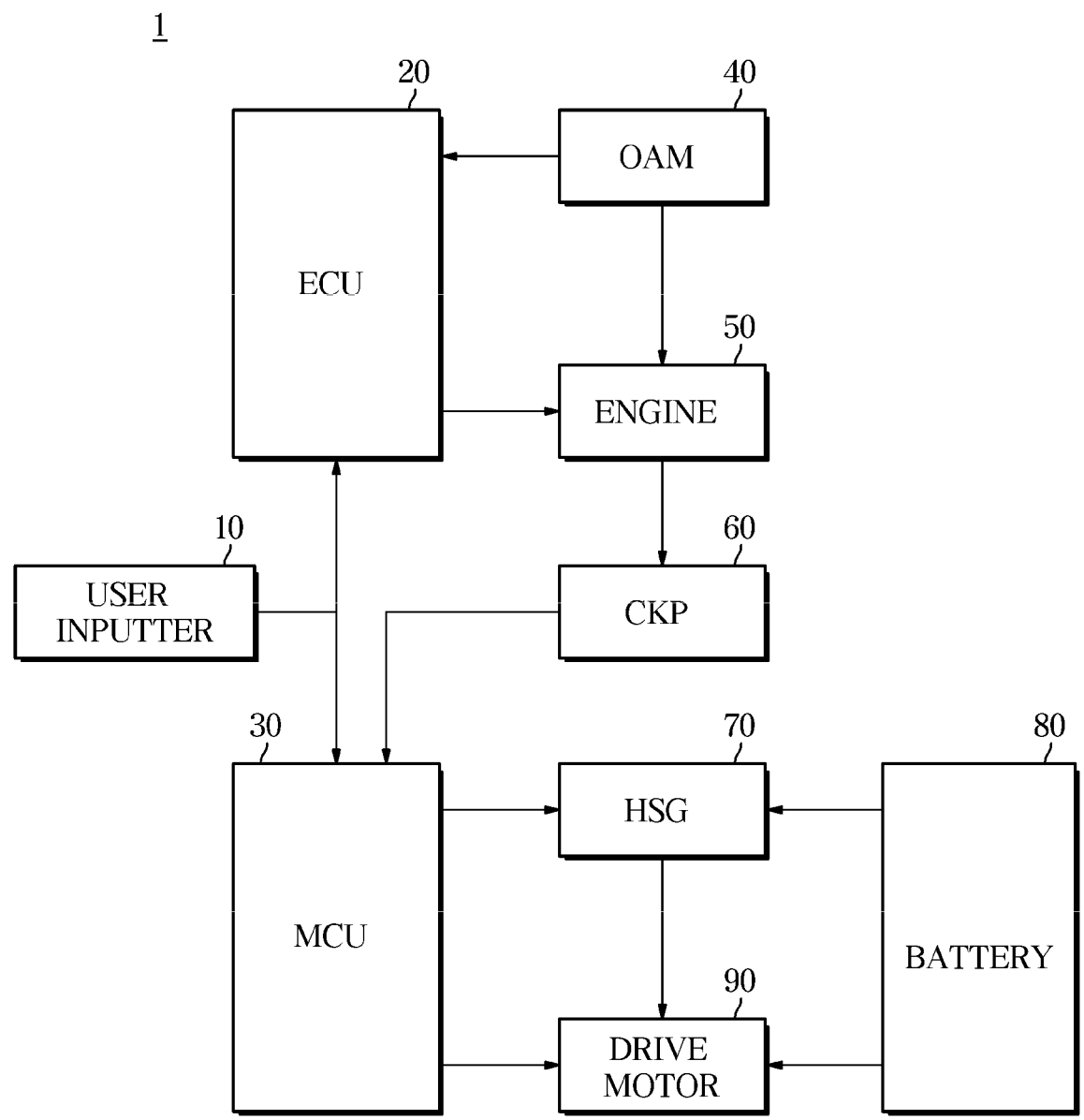
FIG. 1 illustrates a control block diagram of a vehicle in one form of the disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the forms of the present disclosure, examples of which are illustrated in the accompanying drawings, wherein like reference numerals refer to like elements throughout.

Throughout the specification of the present disclosure, terms " . . . part", " . . . module", " . . . member", " . . . block", and the like mean an element capable of being implemented by hardware, software, or a combination thereof. As used in the specification and appended claims, the term " . . . parts", " . . . modules", " . . . members", or " . . . blocks" may be implemented by a single constituent element, or the term " . . . part", " . . . module", " . . . member", or " . . . block" may include a plurality of constituent elements.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present disclosure, if it is assumed that a certain part includes a certain component, the term "comprising or including" means that a corresponding component may further include other components unless context clearly indicates otherwise.

Further, when it is stated that a layer is "on" another layer or substrate, the layer may be directly on another layer or substrate or a third layer may be disposed therebetween.

In description of the present disclosure, the terms "first" and "second" may be used to describe various components, but the components are not limited by the terms. These terms may be used to distinguish one component from another component.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and forms of the present disclosure will hereinafter be given with reference to the attached drawings.

FIG. 1 illustrates a control block diagram of a vehicle in some forms of the disclosure.

The disclosed vehicle 1 relates to a hybrid vehicle that includes a drive motor 90 and an engine 50 as a power source for rotating a wheel (not shown). The hybrid vehicle is divided into a general hybrid vehicle (HEV) which drives the drive motor by charging the battery using driving force of the engine or the regenerative energy generated during braking, and a plug-in hybrid vehicle (PHEV) which charges the battery by receiving power from the outside. Hereinafter, the vehicle 1 will be described as a form of the HEV vehicle, but is not necessarily limited thereto.

Referring to FIG. 1, the vehicle 1 may include a user inputter 10 that receives input commands from the user, a CAMshaft position Sensor (CAM) 40 for generating a position signal of the camshaft provided in the engine 50, a CranKshaft Position sensor (CKP) 60 for generating a pulse signal in accordance with the rotation of the crankshaft provided in the engine 50, an engine 50 and a drive motor 90 for powering a wheel (not shown), a Hybrid Starter Generator (HSG) 70 which starts the engine 50 by the power supplied by the battery 80 and charges the battery 80, an Engine Control Unit (ECU) 20 controlling the engine 50, and an Motor Control Unit (MCU) 30 controlling the HSG 70 and the drive motor 90.

Specifically, the user inputter 10 receives a starting stop command from a driver and a user who rides in the vehicle 1. Here, the starting stop command refers to an input command for stopping the vehicle 1. The engine 50 and the HSG 70, which power the wheels by a starting stop command, may stop operation.

The starting stop command is divided into modes according to the driving state of the vehicle 1. In more detail, the first starting stop command is a command for temporarily stopping the vehicle 1 while driving and may be referred to as an ISG function. The second starting stop command relates to the stopping situation of the vehicle 1 and may be received from the parking command through the gear and the brake. The third starting stop command may be received as a key off command.

The user inputter 10 may include a hardware device that receives for each starting stop command. For example, the user inputter 10 may include a communication device including a wireless communication module in addition to a hardware device such as a button, a gear, or a brake.

On the other hand, the user inputter 10 does not necessarily receive only the starting stop command, but includes a device for receiving a user input for the overall control of the vehicle 1.

The ECU 20 may control the overall operation of the engine 180 according to engine state information such as a request torque signal received by the user inputter 10, temperature of the coolant, and engine torque.

Specifically, the ECU 20 determines the compression cylinder provided in the engine 20 based on the position signal of the camshaft detected by the CAM 40. The ECU 20 may implement fast starting by performing first ignition on the compression cylinder determined according to the restart command received by the user inputter 10.

The MCU 30 may control overall operations of the HSG 70 and the drive motor 90 according to a request torque signal received by the user inputter 10, a starting stop command, and a state of charge (SOC) of the battery 80.

Specifically, the MCU 30 receives a pulse signal from the CKP 60 for detecting the rotation of the crankshaft provided in the engine 50. The MCU 30 determines a non-periodic period, that is, a missing tooth, from the received pulse signal, and counts the received pulse signal based on the determined missing tooth. The MCU 30 determines a section separated by the number of starting stop commands and a preset pulse signal as a stop section. The MCU 30 controls the HSG 70 so that the crankshaft is located in the determined stop section.

The MCU 30 shortens the start time of the engine 50 according to the driver's start command, and has an effect of reducing the start vibration. A specific form in which the MCU 30 determines the stop section will be described later with reference to other drawings below.

Meanwhile, the disclosed vehicle 1 describes an electronic device that receives the pulse signal generated by the CKP 60 as the MCU 30. However, the MCU 30 does not necessarily receive the pulse signal generated by the CKP 60. For example, the vehicle 1 may include a hybrid control unit (HCU) that collectively controls other electronic devices including the MCU 30 and the ECU 20. The HCU may receive a pulse signal generated by the CKP 60 on behalf of the MCU 30. That is, the vehicle 1 is sufficient if the electronic device controlling the HSG 70, not the ECU 20 controlling the engine, receives the pulse signal generated by the CKP 60.

The CAM 40 is a sensor that detects a position signal of a camshaft provided in the engine 50. The CAM 40 transmits the detected position signal to the ECU 20.

The engine 50 is an internal combustion engine that converts thermal energy into mechanical energy by burning fuel, and includes a crankshaft and a camshaft. The engine operates to generate the start command and the required torque transmitted by the user inputter 10 and is stopped according to the starting stop command.

When the engine 50 is stopped and then started again, the torque amount of the engine 50 may vary depending on the stop position of the piston. The stop position of the piston is made through the position control of the crankshaft, and the disclosed vehicle 1 changes the stop position of the piston by the MCU 30 controlling the crankshaft through the HSG 70.

CKP 60 is a sensor that generates a pulse signal in accordance with the rotation of the crankshaft. The pulse signal generated by the CKP 60 is transmitted to the MCU 30.

In a conventional hybrid vehicle, a method of controlling a stop position of a crankshaft is disclosed after the ECU 20 receives a signal from the CKP 60. However, in the prior art, when the engine 50 is completely stopped and the ECU 20 is turned off, accurate position determination due to the reverse rotation of the crankshaft is impossible. In addition, the prior art requires two control units to be operated, respectively, to drive the HSG 70. The disclosed vehicle 1 transmits a pulse signal generated by the CKP 60 to the MCU 30 and performs position control of the crankshaft according to each starting stop command, thereby increasing power consumption and shortening starting time.

The HSG 70 functions as a start motor when the engine 50 is started, and operates as a generator after starting or when the starting is turned off. When operating as a generator, the HSG 70 charges the battery 80 with the recovered energy generated.

The HSG 70 is not necessarily limited to the name, but is distinguished from the drive motor 90, and is sufficient as an auxiliary motor including an AC motor.

The battery 80 provides power to drive the drive motor 90 and the HSG 70. The battery 80 provides a high voltage exceeding 12V and transmits a state of charge of the battery, that is, a state of charge (SOC) to the MCU 30.

The drive motor 90 generates a driving force based on the power provided by the battery 80. The drive motor 90 may further include a sensor (not shown) for detecting a signal for the position of the rotor and a sensor (not shown) for detecting a temperature of the drive motor 90. The signal detected by the drive motor 90 is transmitted to the MCU 30, and the MCU 30 controls the drive motor 30 based on the detected signal.

The configuration of the vehicle 1 described with reference to FIG. 1 may be connected through a communication network in the vehicle, and may transmit a generated signal. For example, the CKP 60 may transmit a pulse signal regarding the position information of the crankshaft to the MCU 30 through a controller area network (CAN).

Meanwhile, the vehicle 1 may further include other components in addition to the above configurations. For example, the vehicle 1 may further include a low DC-DC converter (LDC) for converting the high voltage of the battery 80 into a 12V voltage, a transmission and an inverter.

Figure 2:
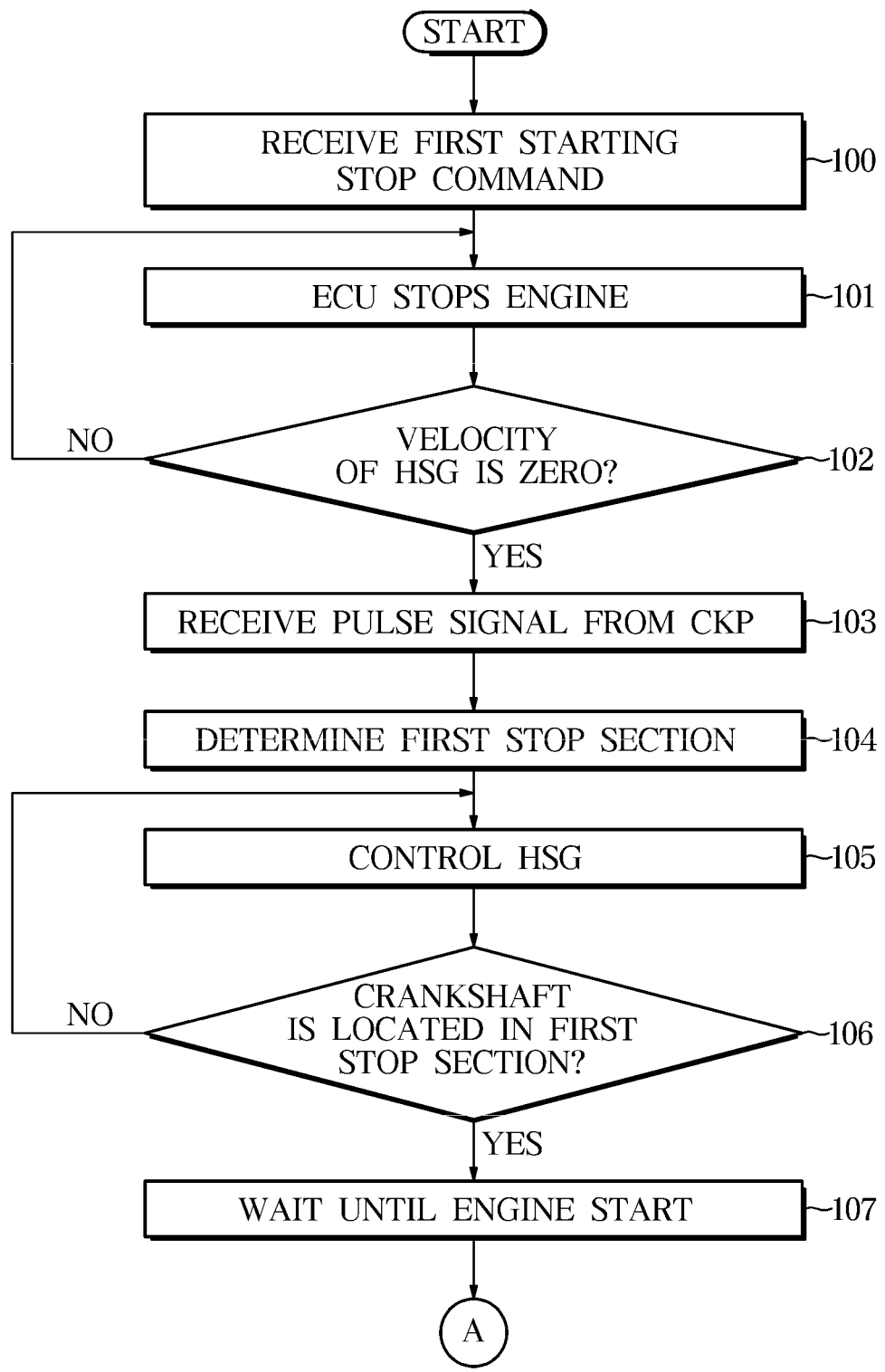
FIGS. 2 and 3 illustrate flowcharts of a control method of operating according to a first starting stop command and a second starting stop command.
Figure 3:
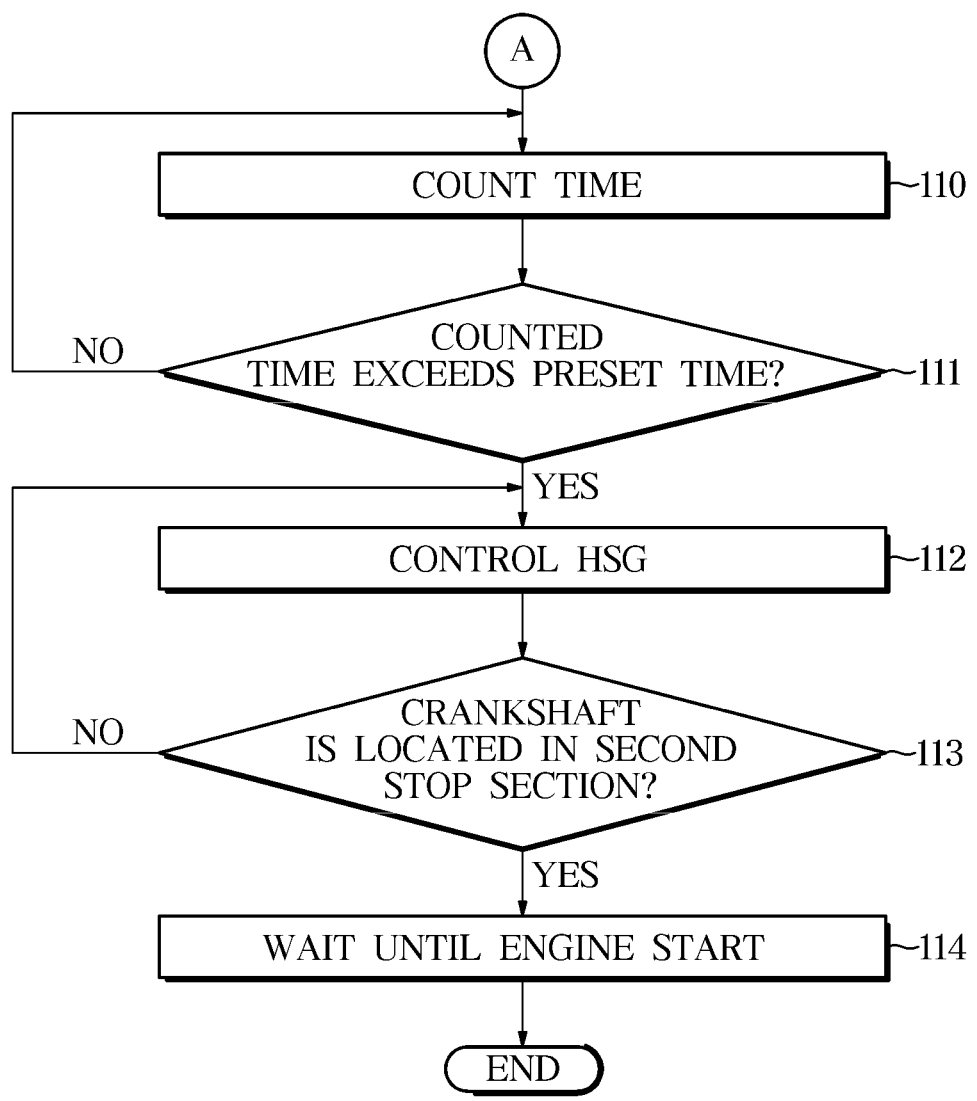

FIGS. 2 and 3 illustrate flowcharts of a control method of operating according to a first starting stop command and a second starting stop command.

Referring to FIGS. 2 and 3 together, vehicle 1 receives a first starting stop command (100).

The first starting stop command refers to an input command relating to a temporary stop state of the vehicle 1 input from a user while driving. For example, the first starting stop command may be input by the driver through the brake.

When the first starting stop command is input, the vehicle 1 may stop the engine to prevent idling of the engine.

The ECU 20 stops the engine (101), and the MCU 30 determines the velocity of the HSG 70 (102).

The HSG 70 may include an AC motor, and the MCU 30 determines whether the rotation velocity of the AC motor becomes zero. When the velocity of the HSG 70 is not zero, the MCU 30 waits until the velocity of the HSG 70 becomes zero.

When the velocity of the HSG 70 is zero, the MCU 30 receives a pulse signal from the CKP 60 (103).

MCU 30 determines a first stop section (104).

The MCU 30 determines the rotation angle of the crankshaft based on the pulse signal received from the CKP 60. The rotation angle of the crankshaft may be determined by counting pulse signals based on the missing tooth. The MCU 30 determines a first stop section corresponding to the first starting stop command based on the determined rotation angle. Depending on the starting stop command, the stop section determined by the MCU 30 may vary.

MCU 30 controls HSG 70 (105).

Specifically, the MCU 30 rotates the crankshaft through the HSG 70. That is, the HSG 70 rotates the crankshaft, and the MCU 30 determines the current position of the crankshaft again based on the pulse signal received from the CKP 60.

The MCU 30 determines whether it is located in the first stop section based on the pulse count value (106).

When the crankshaft rotated by the HSG 70 is not located in the first stop section, the MCU 30 continues to control the HSG 70. When the crankshaft rotated by the HSG 70 is located in the first stop section, the MCU 30 stops controlling the HSG 70 and waits until the engine start command is received (107, A).

MCU 30 counts the time (110, A).

When the preset time is exceeded after the starting stop command is applied, the vehicle 1 may determine that the vehicle stops. After the first starting stop command is applied, the MCU 110 counts a time to determine whether the stop situation.

The MCU 30 compares the counted time with the preset time (111).

When the counted time is less than the preset time, the MCU 30 continues to place the crankshaft in the engine start waiting, ie the first stop section. When the counted time exceeds the preset time, MCU 30 again controls the HSG 70 (112).

The crankshaft rotates through the HSG 70, and the MCU 30 receives a pulse signal from the CKP 60.

The MCU 30 determines whether the crankshaft is located in the second stop section based on the received pulse signal (113).

Here, the second stop section may be different from the first stop section. In a stop situation, the cylinder of the engine 50 in the compression stroke may leak compressed gas. That is, after the stop situation, the engine 50 needs to perform the compression stroke again. Therefore, when it is determined that the preset time has elapsed and the vehicle stops, the MCU 30 rotates the crankshaft in the first stop section and controls the crankshaft to be located in the second stop section.

The MCU 30 determines whether it is located in the second stop section based on the pulse count value (113).

When the crankshaft rotated by the HSG 70 is not located in the second stop section, the MCU 30 continues to control the HSG 70. When the crankshaft rotated by the HSG 70 is located in the second stop section, the MCU 30 stops controlling the HSG 70 and waits until the engine start command is received (114).

Figure 4:
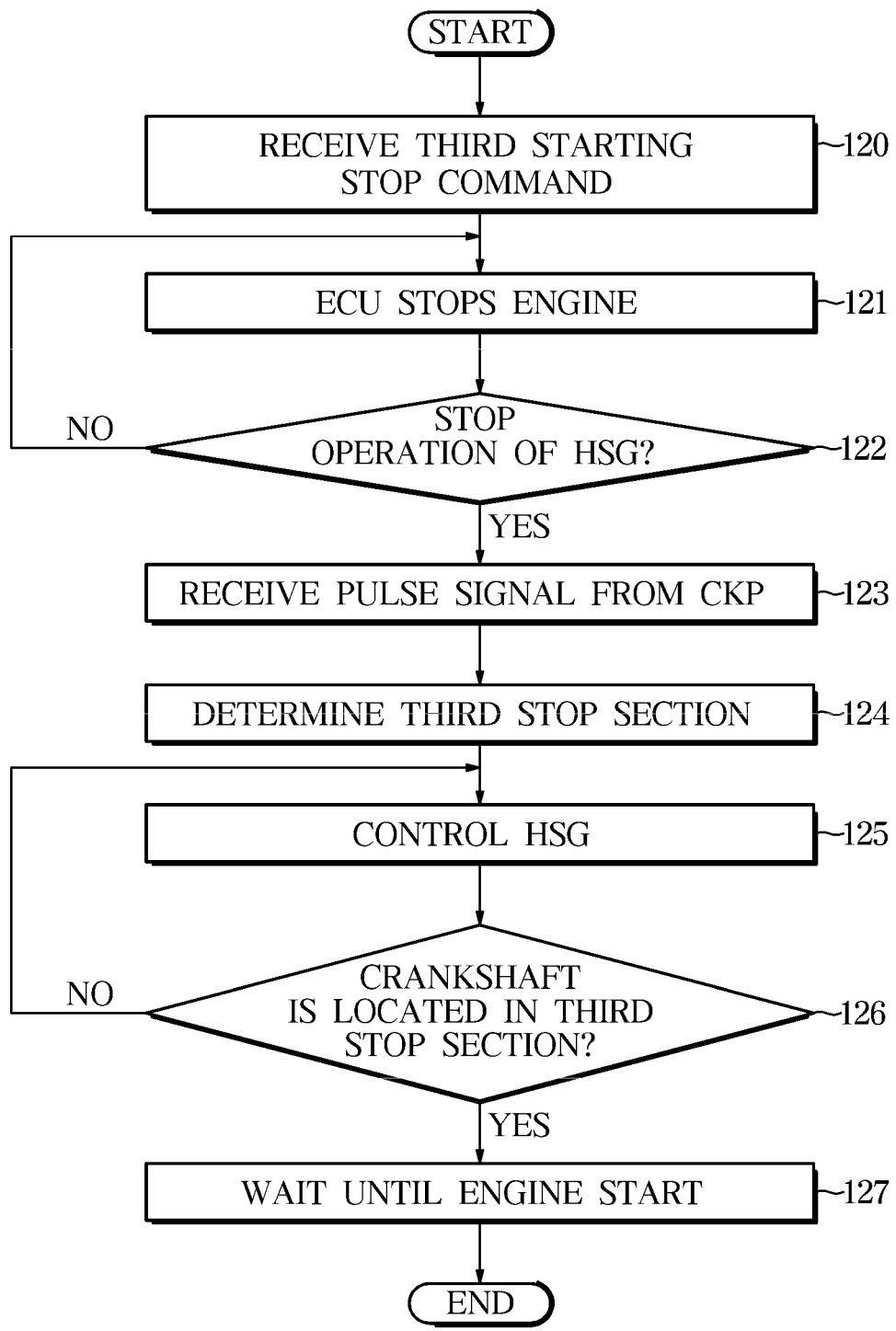
FIG. 4 illustrates a flowchart of a control method of operating according to a third starting stop command.

FIG. 4 illustrates a flowchart of a control method of operating according to a third starting stop command.

Referring to FIG. 4, the vehicle 1 receives a third starting stop command (120).

For example, the third starting stop command may be a key off command. There may be a long term stop situation where the vehicle 1 is completely off by the user.

The ECU 20 stops the engine (121), and the MCU 30 determines the velocity of the HSG 70 (122).

The MCU 30 determines whether the rotation velocity of the HSG 70 becomes zero. When the velocity of the HSG 70 is not zero, the MCU 30 waits until the velocity of the HSG 70 becomes zero.

When the velocity of the HSG 70 is 0, the MCU 30 receives a pulse signal from the CKP 60 (123).

The MCU 30 determines a second stop section (124).

The MCU 30 determines the rotation angle of the crankshaft based on the pulse signal received from the CKP 60. The rotation angle of the crankshaft may be determined by counting pulse signals based on the missing tooth. The MCU 30 determines a third stop section corresponding to the third starting stop command based on the determined rotation angle.

The third starting stop command may be input in a situation such as the driver leaving the vehicle. The engine 50 may be cooled by the environment of the parked location. The MCU 50 places the crankshaft in a position capable of an intake stroke, ie a third stop section, for a smooth start of the engine 50 that may be cooled. Through this, the vehicle 1 may implement efficient starting of the engine.

The MCU 30 controls HSG 70 (125).

The HSG 70 rotates the crankshaft, and the MCU 30 determines the current position of the crankshaft based on the pulse signal received from the CKP 60 again.

The MCU 30 determines whether it is located in the third stop section based on the pulse count value (126).

When the crankshaft rotated by the HSG 70 is not located in the third stop section, the MCU 30 continues to control the HSG 70. When the crankshaft rotated by the HSG 70 is located in the third stop section, the MCU 30 stops controlling the HSG 70. The MCU 30 waits until a situation in which the driver boards the vehicle 1 again, that is, a user input for restarting the engine is received (127).

Figure 5:
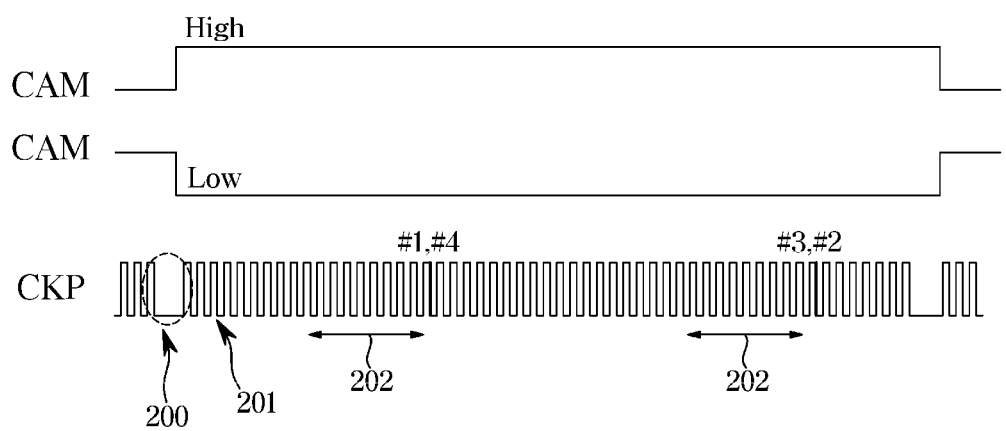
FIG. 5 illustrates a diagram for describing a first stop section.

FIG. 5 illustrates a diagram for describing a first stop section.

In some forms of the present disclosure, the MCU 30 may receive a pulse signal from the CKP 60. The MCU 30 may determine the rotation angle of the current crankshaft by counting the pulse signal.

In FIG. 5, the MCU 30 may determine the rotation angle of the crankshaft by the fifth pulse from the missing tooth 200. Here, the rotation angle is the rotation angle including the reverse rotation of the crankshaft after the engine stops.

According to the start command of the engine 50 received by the user after the first starting stop command, the MCU 30 controls the crankshaft to be located in the first stop section 202. The first stop section 202 corresponds to a stroke section in which a compression stroke may be started or where initial combustion may occur in an ongoing cylinder. The first stop section 202 may be a section away from the preset number of pulses from the missing tooth 200, and is not necessarily limited to the number shown in FIG. 5.

Meanwhile, the MCU 30 may not receive the position signal of the camshaft shown in FIG. 5 from the CAM 40. That is, the MCU 30 may not determine whether the piston top dead center of the cylinder included in the engine 50 is the compression stroke section or the exhaust stroke section only by the pulse signal transmitted by the CKP 60. However, the vehicle 1 may distinguish the compression cylinder from the signal state (High and Low in FIG. 5) of the CAM 40 when the engine 50 is restarted. Through this, by making the first combustion to the corresponding cylinder, the vehicle 1 may realize a quick start.

For example, in the rising section of the piston where the pulse signal corresponds to #1 or #4, when the position signal of the CAM 40 is High, #1 is the cylinder compression stroke section. When the position signal of the CAM 40 is Low, #4 is the cylinder compression stroke section.

Figure 6:
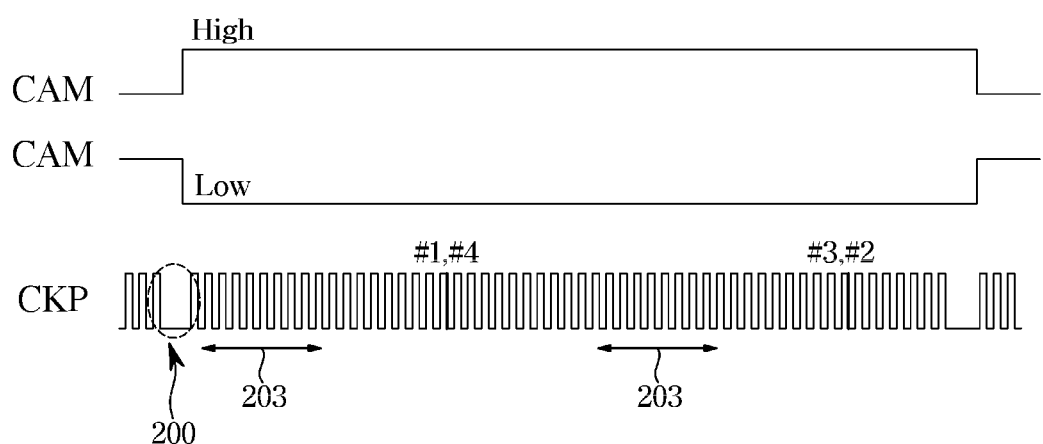
FIG. 6 illustrates a diagram for describing a second stop section.

FIG. 6 illustrates a diagram for describing a second stop section.

Referring to FIG. 6, the second stop section 203 may be determined by a second starting stop command. In the stop situation by the second starting stop command, the compressed gas of the cylinder in the compression stroke may leak. Thus, MCU 30 controls HSG 70 to locate the crankshaft in second stop section 203. The second stop section 203 is a section away from the missing tooth 200 by a preset number of pulses. When the crankshaft is located in the second stop section 203, when the user applies the start command of the engine 50 again, the MCU 30 may add a compression stroke.

Through this, the vehicle 1 may omit the missing tooth search time and the synchronization process of the crankshaft performed by the ECU 20 of the conventional hybrid vehicle, and reduce the starting time and the current consumption of the electronic device required for the starting.

Figure 7:
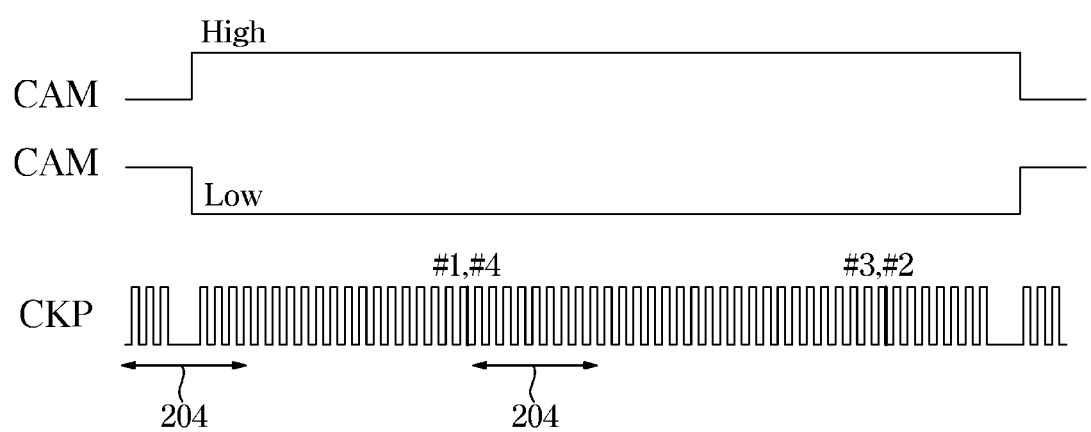
FIG. 7 illustrates a diagram for describing a third stop section.

FIG. 7 illustrates a diagram for describing a third stop section. In the third starting stop command, the vehicle 1 may be stopped for a long time. When the vehicle 1 is parked in a parked place for a long time, the engine 50 may be cooled to a temperature condition in the parking environment. When the temperature of the parked place is below 0° C., the mixed air sucked through the intake stroke may facilitate the restart of the engine 50.

When the third starting stop command is input, the MCU 30 may allow the intake stroke to be added by placing the crankshaft into the third stop section 204. In other words, the MCU 30 may omit the existing engine starting sequence and perform intake, compression, and explosion strokes directly in a specific cylinder.

Through this, the disclosed vehicle 1 may optimally rotate the crankshaft for various starting stop commands, shorten the starting time of the engine 50, and reduce the starting vibration. In addition, the vehicle 1 may shorten the start time of the engine 50, thereby improving the heterogeneity felt by the driver when the vehicle starts in the ISG function. In addition, the vehicle 1 may reduce battery power consumption through the sole control of the MCU 30 even in the off state of the ECU 20.

The vehicle and the control method of the vehicle according to one aspect of the disclosure may control the rotation of the crankshaft through motor control and optimally rotate the crankshaft for various starting stop commands by the MCU receiving the pulse signal of the crankshaft calculated by the conventional ECU.

The vehicle and the control method of the vehicle according to another aspect of the disclosure may shorten engine starting time and have an effect of reducing starting vibration.

The vehicle and the control method of the vehicle according to another aspect of the disclosure may improve the heterogeneity felt by the driver when the vehicle starts in the ISG function by shortening the start time of the engine. The vehicle and the control method of the vehicle according to another aspect of the disclosure may reduce battery power consumption by the MCU controlling independently even when the ECU is off.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
an engine comprising a crankshaft;
an engine control unit (ECU) configured to control the engine;
a crankshaft position sensor (CKP) configured to generate a pulse signal corresponding to a rotation of the crankshaft;
a battery;
a hybrid starter generator (HSG) configured to:
start the engine based on a power of the battery; and
charge the battery; and
a motor controller unit (MCU) configured to:
determine a rotation angle of the crankshaft based on the generated pulse signal; and
control the HSG based on the determined rotation angle in an off-state of the ECU.

2. The vehicle of claim 1, wherein the MCU is configured to:
control the HSG to rotate the crankshaft based on the determined rotation angle and a preset stop section.

3. The vehicle of claim 2, wherein the vehicle further comprises:
an inputter configured to receive a starting stop command of a user,
wherein the MCU is configured to stop operation of the HSG based on the starting stop command.

4. The vehicle of claim 3, wherein the MCU is configured to:
determine a stop section corresponding to the starting stop command; and
control the HSG to locate the crankshaft in the determined stop section based on a missing tooth included in the pulse signal.

5. The vehicle of claim 1, wherein the vehicle further comprises:
a CAMshaft Position Sensor (CAM) configured to detect a position signal of a camshaft included in the engine; and
wherein the MCU is configured to control the HSG while the ECU stops controlling the engine.

6. The vehicle of claim 5, wherein the ECU is configured to control the engine after the MCU rotates the crankshaft.

7. The vehicle of claim 3, wherein the MCU is configured to:
rotate the crankshaft based on a first starting stop command; and
count time.

8. The vehicle of claim 7, wherein the MCU is configured to compare the counted time with a preset time.

9. The vehicle of claim 8, wherein the MCU is configured to:
change the stop section after the preset time elapses; and
rotate the HSG based on the changed stop section.

10. A control method of a vehicle comprising an Engine Control Unit (ECU) controlling engine and a motor controller unit (MCU) controlling a hybrid starter generator (HSG), comprising:
receiving, by the MCU, a pulse signal corresponding to a rotation of a crankshaft of the engine transmitted from a crankshaft position sensor (CKP);
determining, by the MCU, a rotation angle of the crankshaft based on the pulse signal; and
controlling, by the MCU, the HSG based on the determined rotation angle in an off-state of the ECU.

11. The control method of claim 10, wherein controlling the HSG based on the determined rotation angle further comprises:
controlling the HSG to rotate the crankshaft based on the determined rotation angle and a preset stop section.

12. The control method of claim 11, wherein the control method further comprises:
   receiving a starting stop command of a user,
   wherein the controlling the HSG further comprises:
   stopping operation of the HSG based on the starting stop command.

13. The control method of claim 12, wherein controlling the HSG further comprises:
   determining a stop section corresponding to the starting stop command; and
   controlling the HSG to locate the crankshaft in the determined stop section based on a missing tooth included in the pulse signal.

14. The control method of claim 10, wherein controlling the HSG further comprises:
   controlling the HSG while the ECU stops controlling the engine.

15. The control method of claim 14, wherein the control method further comprises:
   controlling, by the ECU, the engine after the MCU rotates the crankshaft.

16. The control method of claim 12, wherein controlling the HSG further comprises:
   rotating the crankshaft based on a first starting stop command; and
   counting time.

17. The control method of claim 16, wherein controlling the HSG further comprises:
   comparing the counted time with a preset time.

18. The control method of claim 17, wherein controlling the HSG further comprises:
   changing the stop section after the preset time elapses; and
   rotating the HSG based on the changed stop section.

* * * * *